June 10, 1941. T. A. WETZEL 2,245,171
REGULATING VALVE
Original Filed April 12, 1937 2 Sheets-Sheet 2

Inventor:
Theodore A. Wetzel
By Brown, Jackson, Boettcher & Dienner
Attys.

Patented June 10, 1941

2,245,171

UNITED STATES PATENT OFFICE 2,245,171

REGULATING VALVE

Theodore A. Wetzel, Milwaukee, Wis., assignor to Milwaukee Gas Specialty Company, Milwaukee, Wis., a corporation of Wisconsin Original application April 12, 1937, Serial No. 136,291. Divided and this application November 13, 1937, Serial No. 174,399

2 Claims. (Cl. 236—99)

This invention relates to regulating valves, and more particularly to an automatic thermostatic regulating valve for controlling the temperatures in ovens and the like.

The present application is a division of my copending application Serial No. 136,291, filed April 12, 1937, now Patent No. 2,198,896 granted April 30, 1940.

While the invention will be described hereinafter in connection with the drawings in combination with a safety shutoff valve responsive to the condition of the pilot flame and in connection with the oven of a domestic gas range, it is to be understood that the regulating valve of the present invention may be employed elsewhere than in connection with an oven burner and without combining a safety shutoff valve therewith.

In its broader aspects, the present invention contemplates a selecting and compensating valve arrangement for establishing and maintaining a predetermined temperature within the space being heated.

It is one of the primary objects of the present invention to provide an improved form of regulating valve adapted for installation in an improved manner, particularly in connection with an oven burner.

Another object of the present invention is to provide an improved regulating valve structure, an improved correlation between the parts of the regulating valve structure, an improved mode of operation and manner of securing the desired regulation by means of such valve, and an improved arrangement and correlation between the regulating valve, the thermostatic control, and the selecting spindle for controlling the position of the regulating valve and selecting the temperature to be maintained within the oven or other space being heated.

A further object of the present invention is to provide an improved correlation between the regulating valve and the pressure responsive or other means for automatically maintaining the selected temperature.

The present invention also contemplates a construction which may be located at any desired point, either upon an oven wall, near the front control manifold of a gas range, or at any other desired location, and which is compact and may be assembled at the place where the same is installed, the only requirement for installation being the connection of the fuel supply conduit to the control unit, the connection of the control unit to the main burner, and the placing of the thermostatic bulb and the pilot tip in their respective locations.

The unit as provided by the present invention is of simple design, relatively compact in size, and is so constructed that a safety shutoff unit may be provided or may be eliminated without requiring any modification in the design of the control equipment for maintaining the desired temperature in the oven or other space.

Further objects and advantages of the present invention will appear more fully from the following detailed description taken in connection with the accompanying drawings, in which.

Figure 1:
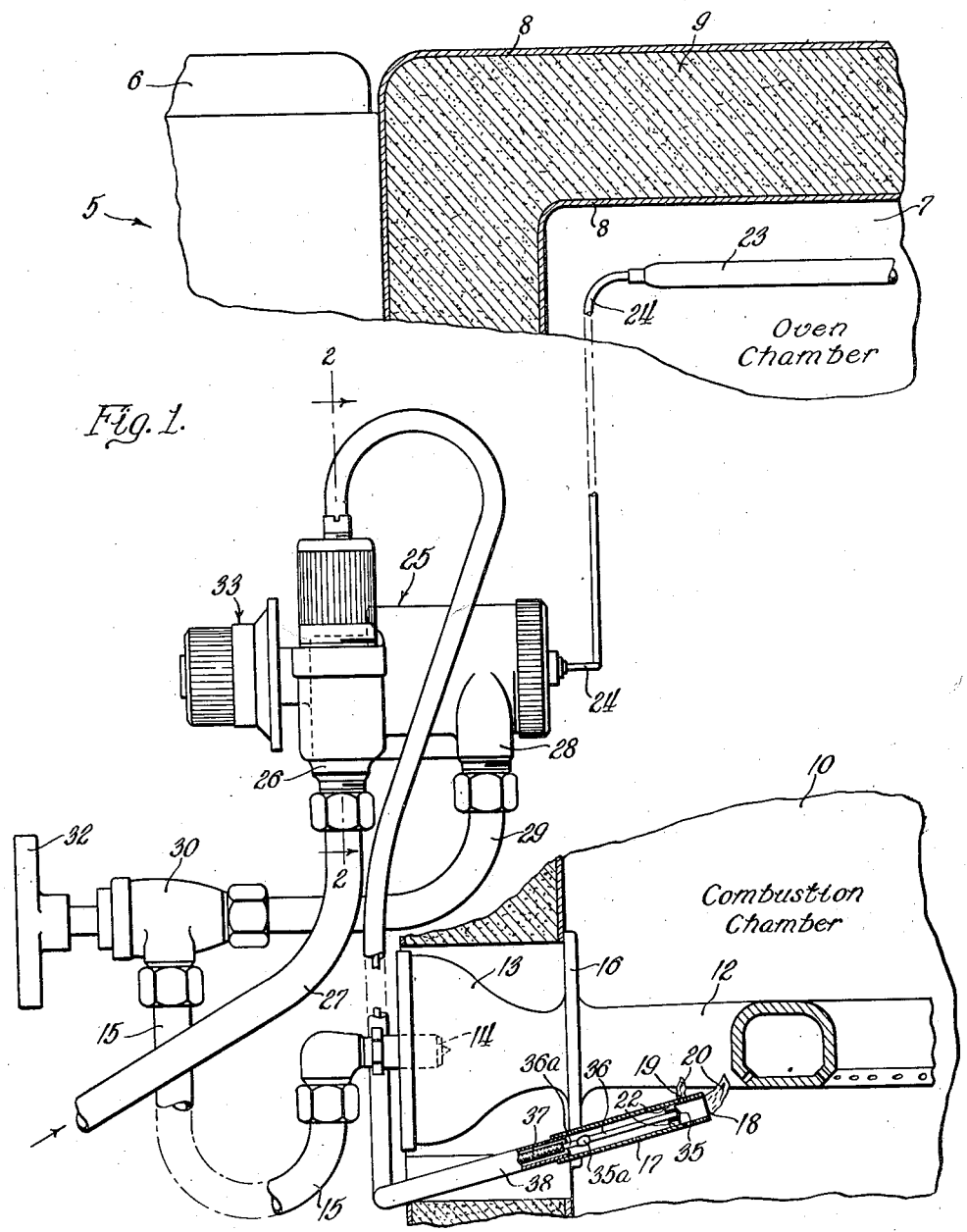
Figure 1 is a view diagrammatically showing the installation of the control unit and its connections in a domestic range or similar oven construction.

Referring now in detail to the drawings, I have indicated generally a domestic gas range 5, having a hinged cover 6 which closes off the open top or range burners when they are not in use, and having the laterally disposed oven chamber 7 confined within the oven walls 8 between which is formed a space adapted to receive insulating material 9.

Below the oven chamber 7 I preferably provide a combustion chamber 10, having a main gas burner 12 therein, which gas burner is provided with the mixing chamber 13 having a gas spud 14 located centrally therein and adapted to receive gas from the conduit member 15.

The burner 12 is supported in any suitable manner within the combustion chamber 10, and preferably the mixing chamber 13 is provided with an annular flange portion 16 definitely positioning the burner within the combustion chamber and abutting against the inner oven wall portion 8. The mixing chamber 13 is preferably provided with the usual regulating shutter for controlling the amount of air admitted thereto for mixture with the gas issuing from the spud 14.

Disposed adjacent the main burner 12 is a pilot tip member 17 having an open end 18 and a port 19 adjacent the open end through which pilot flames 20 are adapted to project for igniting the gas issuing from the ports of the main burner. Orifices, indicated at 22, pass the gas to the port 19 and to the open end 18 of the pilot tip member 17.

Disposed within the oven chamber 7 and preferably located adjacent the upper portion of this chamber is a bulb member 23, containing a fluid which has a relatively high temperature coefficient of expansion, and which is connected through the capillary tubing 24 to the control unit indicated generally at 25. The member 23 constitutes an oven thermal bulb, the pressure of the fluid within the bulb 23 being transmitted through the tube 24 to control the flow of gas to the main burner 12 in a manner to be described in detail hereinafter.

The control unit 25 is provided with a connection 26 adapted to receive the main fuel supply conduit 27, which supplies fuel to the control unit 25 from a suitable gas supply manifold or the like. An outlet port 28 is provided on the unit 25 which is connected through the conduit 29, a valve 30, and the conduit 15, to the main burner supply spud 14 for conducting the fuel to the main burner 12 for ignition by the pilot burner. The valve 30 is preferably provided with an operating handle 32 for manually controlling the gas supply between the conduits 29 and 15. The unit 25 is also provided with the selecting dial indicated generally at 33, which is rotatable for selecting the desired temperature to be maintained within the chamber 7, this temperature being controlled after initial selection by the member 33 through the thermal bulb member 23 in a manner to be described in detail hereinafter.

Disposed within the pilot tip 17 is a hot thermocouple junction indicated at 35, this junction being formed between the sleeve member forming the pilot tip 17 and an inner conductor member 36 which is welded thereto as indicated. The inner thermocouple member 36 is connected through the cold junction 35a with the thermocouple lead 36a which extends through the insulation 37 within the metallic tubing 38 to the control member 25. The junction 35 is subjected to the heat of the pilot flame, and the lead 36, together with the tube 38, forms the two conductors of a flexible lead for leading the current generated at the tip 35 back to suitable control means positioned within the control unit 25.

Figure 2:
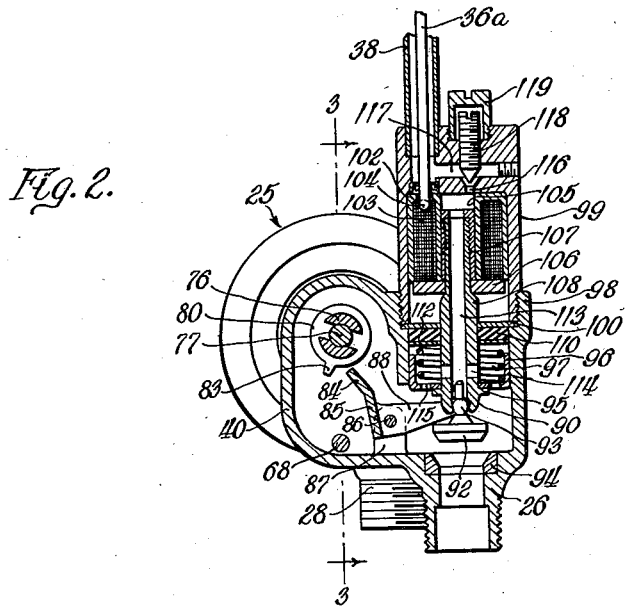
Figure 2 is a sectional view taken substantially on line 2—2 of Figure 1, illustrating in detail the construction of the safety shutoff unit.
Figure 3:
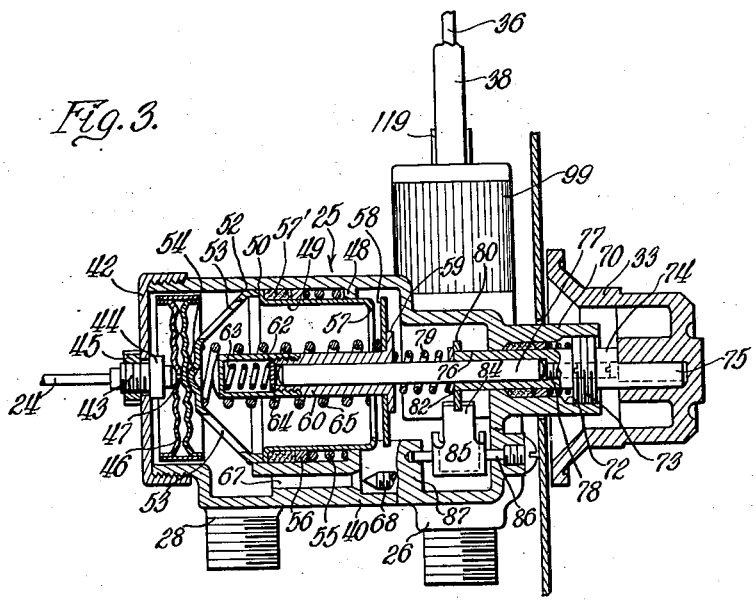
Figure 3 is a sectional view taken substantially on line 3—3 of Figure 2, illustrating the details of the oven temperature selecting and control means.

Considering now in detail the structure shown in Figures 2 and 3, the unit 25 comprises a main housing member 40 which is provided with a closure cap 42 at one end thereof, this cap forming a suitable support for a bushing 43 which extends thereinto and which supports the capillary tube 24, the bushing 43 being provided with the shoulder 44 which abuts against the inner face of the cap 42, and with a suitable nut 45 for clamping the bushing in position on the cap.

The capillary tube 24 is connected, within the housing 40, to a diaphragm power element indicated generally at 46, which is secured as indicated at 47 to the inner end of the bushing 43, whereby pressure changes within the member 23 are transmitted through the tube 24 to the interior of the element 46, thereby expanding and contracting the same.

The housing 40 is provided intermediate its ends with an inwardly extending flange portion 48 which is adapted to form a guide for the reciprocatory valve member 49 adapted to have longitudinal sliding movement within the flange 48. At its end the member 49 is provided with the radial flange portion 50 forming a seat for a metal cage member 52 having openings 53 therein allowing for passage of gas therethrough. The member 52 is provided with an end boss 54 adapted to have bearing engagement against the inner end of the diaphragm, and to be reciprocated thereby axially of the housing 40 upon expansion and contraction of the diaphragm 46.

The flange 48 also forms one seat for a coiled spring member 55 encircling the member 49, the opposite end of the spring bearing against an annular ring 56 which encircles the member 49 between which and the flange 50 there is disposed suitable packing 57' for sealing the outer surface of the member 49 against leakage of gas therepast. This spring 55 normally urges the valve member 49 and the cage member 52 into abutting engagement against the diaphragm power element 46.

At its opposite end, the member 49 is provided with an inwardly extending flange 57, defining a valve opening into the interior of the member 49, which is adapted to have relative movement with respect to a valve disc member 58, preferably formed as a bimetallic disc for temperature compensation, although this is optional. The disc 58 is seated against the radial flange 59 carried by the sleeve member 60, which sleeve member terminates in a threaded end receiving the threaded sleeve or cup-shaped end cap 62, this end cap containing the coil spring member 63 biased at one end against the inner face of the cap 62 and at the opposite end being biased against a disc member 64 carried therein and stopped against the threaded shoulder formed at the connection between the sleeves 60 and 62. A suitable coil spring 65 is biased against the disc 58 at one end for holding the disc firmly against the flange 59, and at its opposite end is biased against the end portion of the cage member 52, as clearly shown in Figure 3. Thus the spring 65 forms a resilient connection between the disc and the cage member 52. The housing 40 is provided with a suitable by-pass portion 67 which by-passes the valve cage member 52 and valve member 49 and which is controlled by means of a suitable metering screw shown more or less diagrammatically in Figure 3 at 68. This by-pass is for the purpose of insuring a minimum flow to the main burner 12 through the port 28 and the conduits 29 and 15 even when the valve member 49 is seated against the disc 58, in order to insure ignition of the main burner with a minimum setting of the control unit.

At its opposite end, the housing 40 is provided with a reduced cylindrical extension 70, which extension is provided with a counterbore 72 that is internally threaded to receive the threaded bushing 73 carried by the selecting spindle 74. The spindle 74 is provided with a slabbed off portion 75 whereby the dial member 33 may be secured thereto for conjoint rotation therewith, so that upon rotation of the dial member 33 the spindle 74 is threaded axially of the extension 70, producing axial movement of the hollow extending portion 76 of the spindle. The sleeve member 60 and the extending portion 76 of the spindle are adapted to provide suitable supports for a motion transmitting rod 77, which rod at its outer end is adapted to be engaged by a dial calibrating screw 78 carried within the spindle 75 and adjustable to calibrate the control unit for the particular conditions encountered in the installation. At its opposite end the rod 77 engages the disc 64 pressed thereagainst by the spring 63. Upon rotation of the dial 33, therefore, the spindle 74 is threaded axially inwardly, producing axial inward movement of the rod 77, and this rod, through the spring 63, carries the sleeve member 60 and the valve disc 58 to the left, as viewed in Figure 3, tending to close the opening through the member 49. The spring 63 acts to accommodate over travel, and prevents stressing of the diaphragm when the rod 77 moves toward the diaphragm under the influence of rotation of the dial 33. Rotation of the dial 33 in the opposite direction moves the spindle 74 outwardly, and the spring 63 thereupon forces the rod 77 to follow the outward movement of the spindle to a point at which the disc 64 engages the threaded end of the sleeve 60. The follower spring 65 is counteracted by a suitable retaining spring 79 encircling the rod 77 between the sleeve 60 and the portion 76 of the spindle, and the disc 58 is therefore adapted to move substantially conjointly with the sleeve 60 and rod 77, independent of any movement of diaphragm 46. The spring 79 is not strong enough to force washer 64 away from rod 77 against the pressure of spring 65, but merely holds the cocking finger 80 in place on hollow spindle 76. Preferably the rod 77 is made of "Invar," while the housing 25 is made of brass, in order to provide for temperature compensation of the element to prevent an error in calibration thereof due to the temperature to which the unit is subjected.

It will also be noted that when the temperature within the chamber 7, as sensed by the bulb 23, increases, there will be an increase of pressure in the diaphragm of power element 46, reacting against the cage member 53 to move the valve assembly toward the disc 58, thereby reducing the flow of fuel through the port 28. Upon a decrease of temperature in the oven chamber, the pressure in the power element decreases and the spring 55 thereupon causes the cage element 52 to follow the diaphragm to its collapsed position, the spring 55 at the same time moving the valve element 49 conjointly with the cage member 52 to open the valve opening between the disc 58 and the flange 57, thereby increasing the flow of fuel to the main burner. Thus, the dial 33 when rotated to the selected position, produces a predetermined setting of the disc 58 with respect to the valve member 49, to allow approximately the proper quantity of fuel therepast into the main burner. Variations of temperature within the main burner from the selected temperature will cause variations in the pressure within the power element diaphragm 46, and consequently will vary the setting of the valve member 49 with respect to the disc 58 to vary the flow of fuel in accordance with the variations in temperature, increasing the flow of fuel upon decreases in temperature and decreasing the flow of fuel upon increases in temperature.

Mounted upon the extended portion 76 of the spindle 74 is a cocking finger indicated generally at 80, this finger being held in position on the extension 76 of the spindle by the retainer spring 79 bearing against the disc 82 at the end of the projecting portion of the spindle. The cocking finger 80, as indicated clearly in Figure 2, is adapted for conjoint rotation with the spindle 76, and has a projecting cam portion 83 adapted to engage one end 84 of a bell crank member 85 pivoted upon the pin 86 carried by the shoulder portion 87 formed integral with the housing 40. The bell crank member 85 has an extending arm portion 88, clearly shown in Figure 2, which is adapted to engage a reciprocatory valve stem member 90 carrying the valve member 92 at the lower end thereof by means of the ball and socket connection indicated at 93. The valve member 92 is adapted to seat against the valve seat insert 94 carried at the upper end of the offset portion 26 of the housing 40, and the stem 90 is provided with a suitable radial flange 95 engaged by the radial portion of a cup-shaped follower member 96 whereby the valve stem and valve member are normally urged toward the valve seat by the spring 97.

The housing 40 is provided, on its upper surface in alignment with the opening to the inlet port 26, with an extension 98 interiorly threaded to receive the housing 99 of the safety shutoff unit for controlling the valve member 92. The housing 99 is threaded into the extension 98, and a suitable washer 100 is compressed in position across the lower end thereof, the washer being apertured to provide for reciprocatory movement of the valve stem 90 therethrough. Disposed in the upper portion of the housing 99 is a substantially annular magnet frame portion 102, which is of generally cup-shaped section and which is provided with the magnetic coil 103 having connection at one end with the conductor 36a, as indicated at 104. The central portion of the magnet frame 102 forms a cylindrical bore 105 in which the upper portion of the valve stem 90 is adapted to reciprocate. At its lower end, the pole face of the magnet is adapted to engage a soft iron disc member 106, forming an armature carried by the valve stem 90 and suitably secured to the reduced portion of the valve stem by means of the threaded sleeve 107 through which the armature 106 is loosely secured against the shoulder 108 of the valve stem. Suitable sealing means 110 is compressed against the under face of the washer 100 by means of the washer 112 against which the upper end of the spring 97 is adapted to seat. The valve stem 90 is provided with an axial bore 113, provided adjacent its lower end with laterally extending openings 114 providing communication through the ports 115 in the cup-shaped follower 96 with the interior of the housing 40 and therefore providing for flow of fuel from the port 26 through the openings 115 and the ports 114 into the passage 113 of the valve stem, the fuel from this passage entering the cylindrical bore 105 of the magnet frame and passing out through the metering valve opening 116 to the transversely extending passage 117 communicating with the interior of the metallic tubing 38 leading to the thermocouple. A suitable metering screw 118 is provided for controlling the flow of pilot fuel through the passage 116, this screw being adjusted by a suitable screw driver or the like, and being protected from unauthorized adjustment by means of the cap member 119 threaded into the upper end of the housing 99.

In the operation of the structure as thus far described, the gas flowing from the conduit 27 into the interior of the unit 25 through the port 26 passes the valve seat 94 and fills the interior of the chamber or housing 40 at the right hand side as viewed in Figure 3. A portion of this gas passes upwardly through the valve stem and through the tube 38 to the pilot tip member 17, issuing through the orifices 22 past the welded hot junction 35 and out of the ports 18 and 19 to produce a pilot flame for insuring ignition of the burner 12 when gas is admitted thereto. A small portion of the gas moves through the bypass opening 67 controlled by the metering screw 68 to the burner 12 when the valve 92 is in open position, and the remaining portion of the gas moves past the disc 58 and the valve member 49 and through the cage member 52 to the port 28 for supplying the controllable quantity of fuel to the burner 12 to maintain the desired temperature within the oven chamber 7.

The dial 33 is rotated to the desired position for initially setting the valve opening between the disc 58 and the member 49, and the valve member is automatically adjusted in accordance with the temperature within the oven chamber 7 through the bulb 23 and the capillary tube 24 and power diaphragm element 46 for maintaining the selected temperature within the oven.

Assume now that the pilot flame is accidentally extinguished. This immediately causes cooling of the junction 35, and consequently produces deenergization of the magnet coils 103 in the magnet frame 102. This results in the armature 106 no longer being held in attracted position against the pole face of the magnet frame, and consequently the spring 97 snaps the valve stem 90 downwardly to move the armature away from the magnet frame, and simultaneously move the valve 92 into engagement with the valve seat 94. This shuts off all flow of fuel to the pilot burner and to the main burner. The valve 92 will remain closed as long as the pilot flame is unignited, and the dial member 33 is not actuated from its previous set position.

To reignite the pilot flame it is necessary to rotate the dial member 33 in a clockwise direction to its limiting position, which will result in rotation of the cam member 80 to cause the finger 83 to rock the bell crank 85 about its pivot, raising the valve stem 90 and simultaneously moving the armature 106 carried by the shoulder 108 up against the pole faces of the magnet frame 102. It is necessary that the dial 33 remain in this position until gas passing through the valve stem and through the tube 38 is ignited at the pilot tip 17 to produce the pilot flame 20, which causes heating of the thermocouple junction 35 and consequently energization of the coils 103, thereby energizing the magnet and maintaining the armature in attracted position. The dial member 33 may then be rotated in a counterclockwise direction to the desired position for producing a predetermined temperature in the oven, thereby actuating the disc member 58 to produce a predetermined setting of the disc with respect to the valve member 49 for allowing a flow of gas through the conduits 28 and 15 to the main burner. As the burner temperature varies within the oven chamber 7, the diaphragm element 46 will vary the position of the valve member 49 with respect to the disc 58 to maintain a predetermined temperature in the oven, this being determined in advance by proper calibration of the unit. Assuming that the member 49 is seated against the disc 58, there will still be a sufficient supply of fuel through the by-pass 67 to maintain a minimum low fire fuel supply to the main burner to insure ignition thereof and to maintain a minimum temperature within the oven.

It will be noted that the entire selecting and control mechanism for maintaining and controlling the flow of fuel to the main burner is independent of the safety shutoff unit except insofar as control of the fuel to the burner for maintaining a predetermined temperature in the oven is concerned, and it would be possible to remove the housing 99 from the extension 98, thereby removing the valve assembly 92 in the valve stem 90, and to seal this extension by means of a suitable closure plug if the safety control unit is not to be incorporated in the general control system. Thus the present assembly provides for manufacture either of a control unit for regulating the temperature of the oven only, or a control unit which can be readily adapted for use by the inclusion of the housing 99 and the ancillary pilot burner and thermocouple equipment to provide a combined oven heat regulator and safety shutoff unit.

While it is apparent that various changes and modifications in details of the present invention may be made without departing from the underlying principles thereof, the illustrated embodiment of the invention discloses a preferred manner of accomplishing the purposes of the present invention. However, it is to be understood that I do not intend to be limited to the exact details shown and described, but only insofar as defined by the scope and spirit of the appended claims.

I claim:

1. In a device of the class described, a valve housing having an inlet and an outlet, a selecting spindle having threaded engagement in said housing, a rod actuated axially by rotation of said spindle, a sleeve slidable upon said rod and and having a flange at one end, a spring confined within said sleeve and biased between the other end of said sleeve and the adjacent end of said rod, a valve disc member encircling said sleeve, a sleeve-like valve member reciprocable in said housing and having a valve opening at one end adapted for control by said valve disc member, thermally actuated means at the opposite end of said sleeve-like valve member, a cooperating member engaged by said thermally actuated means at position substantially in axial alignment with said rod and extending radially and coacting at its outer periphery with the adjacent end of said sleeve-like valve member, and a spring surrounding said sleeve member and disposed within said sleeve-like valve member, said spring being biased between said cooperating member and said valve disc member to seat said valve disc member against the flange on said sleeve member so that the valve disc member will be actuated axially by axial actuation of said rod.

2. In a device of the class described, a valve housing having an inwardly extending guide flange, a sleeve-like valve member reciprocable in said guide flange, said sleeve-like valve member having a valve opening at one end and a flange at the other end, a selecting spindle having threaded engagement in said housing, a rod actuated axially by rotation of said spindle, a sleeve slidable upon said rod and having a flange at one end, a spring confined within said sleeve and biased between the other end of said sleeve and the adjacent end of said rod, a valve disc member encircling said sleeve and adapted for controlling the valve opening at one end of said sleeve-like valve member, a spring surrounding said sleeve member and acting against said valve disc member to seat same against the flange on said sleeve member so that the valve disc member will be actuated axially by axial actuation of said rod, thermally actuated means at the opposite end of said sleeve-like valve member, a cooperating member engaged by said thermally actuated means at position substantially in axial alignment with said rod and extending radially and coacting at its outer periphery with the flange at the adjacent end of the sleeve-like valve member, and a spring encircling the sleeve-like valve member and biased between the flange on said sleeve-like valve member and the guide flange on said valve housing for normally maintaining the flanged end of said sleeve-like valve member in cooperation with said cooperating member and said cooperating member in cooperation with said thermally actuated means.

THEODORE A. WETZEL.